US008463413B2

(12) United States Patent
Oh et al.

(10) Patent No.: US 8,463,413 B2
(45) Date of Patent: Jun. 11, 2013

(54) METHOD AND AN APPARATUS FOR PROCESSING AN AUDIO SIGNAL

(75) Inventors: Hyen O Oh, Seoul (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 12/530,524

(22) PCT Filed: Mar. 7, 2008

(86) PCT No.: PCT/KR2008/001318
§ 371 (c)(1),
(2), (4) Date: Mar. 22, 2010

(87) PCT Pub. No.: WO2008/111773
PCT Pub. Date: Sep. 18, 2008

(65) Prior Publication Data

US 2010/0191354 A1 Jul. 29, 2010

Related U.S. Application Data

(60) Provisional application No. 60/894,162, filed on Mar. 9, 2007, provisional application No. 60/942,967, filed on Jun. 8, 2007, provisional application No. 60/012,022, filed on Dec. 6, 2007.

(30) Foreign Application Priority Data

Mar. 7, 2008 (KR) ........................ 10-2008-0021381

(51) Int. Cl.
*G06F 17/00* (2006.01)

(52) U.S. Cl.
USPC ........................................................... 700/94

(58) Field of Classification Search
USPC ........................................................... 700/94
See application file for complete search history.

(56) References Cited

U.S. PATENT DOCUMENTS

| | | | |
|---|---|---|---|
| 3,783,192 | A | 1/1974 | Takahashi |
| 4,251,688 | A | 2/1981 | Furner |
| 6,026,168 | A | 2/2000 | Li et al. |
| 6,496,584 | B2 | 12/2002 | Irwan et al. |
| 6,952,677 | B1 | 10/2005 | Absar et al. |
| 7,103,187 | B1 | 9/2006 | Neuman |
| 2001/0055398 | A1 | 12/2001 | Pachet et al. |

(Continued)

FOREIGN PATENT DOCUMENTS

| | | | |
|---|---|---|---|
| AU | 2007328614 | A1 | 6/2008 |
| AU | 2008295723 | B2 | 3/2009 |

(Continued)

OTHER PUBLICATIONS

Faller, "Parametric Joint-Coding of Audio Sources", AES 120th Convention, vol. 2, May 20, 2006, pp. 1-12.*

(Continued)

*Primary Examiner* — Joseph Saunders, Jr.
(74) *Attorney, Agent, or Firm* — Birch, Stewart, Kolasch & Birch, LLP

(57) ABSTRACT

A method of processing an audio signal is disclosed. The present invention includes receiving the audio signal including object information, obtaining correlation information indicating whether an object is grouped with other object from the received audio signal, and obtaining one meta information common to grouped objects based on the correlation information.

14 Claims, 6 Drawing Sheets

U.S. PATENT DOCUMENTS

| | | | | |
|---|---|---|---|---|
| 2002/0136414 | A1 | 9/2002 | Jordan et al. | |
| 2003/0026441 | A1 | 2/2003 | Faller | |
| 2005/0078831 | A1 | 4/2005 | Irwan et al. | |
| 2005/0089181 | A1 | 4/2005 | Polk, Jr. | |
| 2005/0271215 | A1 | 12/2005 | Kulkarni | |
| 2006/0115100 | A1 | 6/2006 | Faller | |
| 2006/0174267 | A1 | 8/2006 | Schmidt | |
| 2007/0165869 | A1 * | 7/2007 | Ojanpera | 381/23 |
| 2007/0183617 | A1 | 8/2007 | Yokota et al. | |
| 2007/0213990 | A1 | 9/2007 | Moon et al. | |
| 2007/0255572 | A1 | 11/2007 | Miyasaka et al. | |
| 2009/0252339 | A1 | 10/2009 | Obata et al. | |
| 2011/0013790 | A1 * | 1/2011 | Hilpert et al. | 381/300 |
| 2011/0022402 | A1 * | 1/2011 | Engdegard et al. | 704/501 |

FOREIGN PATENT DOCUMENTS

| | | | |
|---|---|---|---|
| CN | 101529501 | A | 9/2009 |
| EP | 1691348 | A1 | 8/2006 |
| EP | 2083584 | A1 | 7/2009 |
| JP | 51-92101 | A | 7/1976 |
| JP | 3-163997 | A | 7/1991 |
| JP | 09-046799 | A | 2/1997 |
| JP | 9-200897 | A | 7/1997 |
| JP | 2001-503581 | A | 3/2001 |
| JP | 2001-306081 | A | 11/2001 |
| JP | 2002-177452 | A | 6/2002 |
| JP | 2003-263858 | A | 9/2003 |
| JP | 2004-193877 | A | 7/2004 |
| JP | 2005-006018 | A | 1/2005 |
| JP | 2005-512434 | A | 4/2005 |
| JP | 2005-286828 | A | 10/2005 |
| JP | 2005-354695 | A | 12/2005 |
| JP | 2006-3580 | A | 1/2006 |
| JP | 2006-508592 | A | 3/2006 |
| JP | 2006-211206 | A | 8/2006 |
| JP | 2006-217210 | A | 8/2006 |
| JP | 2006-345480 | A | 12/2006 |
| JP | 2007-058930 | A | 3/2007 |
| JP | 2007-67463 | A | 3/2007 |
| JP | 2010-521002 | A | 6/2010 |
| RU | 2005103637 | A | 7/2005 |
| WO | WO 2004/008805 | A1 | 1/2004 |
| WO | WO 2006/022124 | A1 | 3/2006 |
| WO | WO 2006/072270 | A1 | 7/2006 |
| WO | WO 2006/084916 | A2 | 8/2006 |
| WO | 2006/126843 | A2 | 11/2006 |
| WO | WO-2006/126844 | A2 | 11/2006 |
| WO | WO-2007/004828 | A2 | 1/2007 |
| WO | WO-2007/004830 | A1 | 1/2007 |
| WO | WO 2007/013776 | A1 | 2/2007 |
| WO | WO 2007/016107 | A2 | 2/2007 |
| WO | WO-2007/027051 | A1 | 3/2007 |
| WO | WO 2007/034806 | A1 | 3/2007 |
| WO | WO 2008/046531 | A1 | 4/2008 |
| WO | WO-2008/069593 | A1 | 6/2008 |

OTHER PUBLICATIONS

Faller, "Coding of Spatial Audio Compatible with Different Playback Formats", Audio Engineering Society Convention Paper, Oct. 28-31, 2004.

Breebaart et al., "Multi-Channel Goes Mobile: MPEG Surround Binaural Rendering", AES 29th International Conference, Sep. 2-4, 2006.

Herre et al., "The Reference Model Architecture for MPEG Spatial Audio Coding", Audio Engineering Society Convention Paper 6447, May 28-31, 2005.

Breebaart et al., "MPEG Spatial Audio Coding/ MPEG Surround: Overview and Current Status", Audio Engineering Society Convention Paper, Oct. 7-10, 2005.

Moon et al., "A Multi-Channel Audio Compression Method with Virtual Source Location Information for MPEG-4 SAC", IEEE Transactions on Comsumer Electronics, vol. 51, No. 4, Nov. 2005, pp. 1253-1259.

Faller, "Parametric Coding of Spatial Audio", Presentee a la Faculte Informatique et Communications, Ecole Polytechnique Federale de Lausanne, Pour L'Obtention du Grade de Docteur es Sciences, These No. 3062, 2004.

Liebchen et al., "Improved Forward-Adaptive Prediction for MPEG-4 Audio Lossless Coding", Audio Engineering Society Convention Paper, presented at the 118th Convention. May 28-31, 2005, Barcelona, Spain.

Liebchen et al., "The MPEG-4 Audio Lossless Coding (ALS) Standard-Technology and Applications", Audio Engineering Society, Convention Paper, presented at the 119th Convention, Oct. 7-10, 2005.

Avendano et al., "Frequency Domain Techniques for Stereo to Multichannel Upmix", AES 22nd International Conference on Virtual, Synthetic and Entertainment Audio, pp. 1-10, XP007905188, Jun. 1, 2002.

Faller, "Matrix Surround Revisited", AES 30th International Conference, Mar. 15-17, 2007, pp. 1-7, XP002496463, Saariselkä, Finland.

Jot et al., "Spatial Enhancement of Audio Recordings", AES 23rd International Conference, May 23-25, 2003, pp. 1-11, XP002401944, Copenhagen, Denmark.

"Call for Proposals on Spatial Audio Object Coding", ITU Study Group 16, Video Coding Experts Group, ISO/IEC JTC1/SC29/WG11, MPEG2007/N8853, Jan. 2007, pp. 1-20, Marrakech, Morocco.

Herre et al., "The Reference Model Architecture for MPEG Spatial Audio Coding", Audio Engineering Society Convention Paper 6447, 118th Convention, May 28-31, 2005, pp. 1-13.

Beack et al., "CE on Multichannel sound scene controll for MPEG Surround", ISO.IEC JTC1/SC29/WG11 MPEG2006/M13160, 2006, p. 1-9.

* cited by examiner

FIG. 3

| | |
|---|---|
| | for ( i=0; i<numObjects; i++ ) { |
| | bsRelatedTo[i][i] = 1; |
| | for( j=i+1; j<numObjects; j++ ) { |
| | if ( !objectIsGrouped[j] && !bsRelatedTo[i][j] ) { |
| S310 | **bsRelatedTo[i][j];** |
| | bsRelatedTo[j][i] = bsRelatedTo[i][j]; |
| S320 | if ( bsRelatedTo[i][j] == 1 ) { |
| | objectIsGrouped[i] = 1; |
| | objectIsGrouped[j] = 1; |
| | for( k=i; k<j; k++ ) { |
| S330 | if( bsRelatedTo[i][k] == 1 ) { |
| | bsRelatedTo[j][k] = 1; |
| | bsRelatedTo[k][j] = 1; |
| | } |
| | ... |

FIG. 4

| | |
|---|---|
| | for ( k=0; k<numObjects; k++ ) { |
| S410 | **bsObjectType[k];** |
| | } |
| | for (k=0; k<numObjects; k++) { |
| S420 | **bsRelatedTo[k] [k] = 1;** |
| | if (objectType(k) ==1) { |
| | bsRelatedTo(k,k+1)=1; |
| | bsRelatedTo(k+1,k)=1; |
| | bsRelatedTo(k+1,k+1)=1; |
| | objectIsGrouped(k)=1; |
| | objectIsGrouped(k+1)=1; |
| | k=k+1; |
| | } |
| | } |

FIG.5

| | |
|---|---|
| S510 | btsidx=1; |
| | for (k=0; k<numObjects; k++) { |
| S520 | **bsObjectType[k];** |
| | if (bsobjectType(k)==1) { |
| | k=k+1; |
| S530 | objectType(k)=1; |
| | } |
| | } |
| | for (k=0; k<numObjects; k++) { |
| | bsRelatedTo[k] [k] = 1; |
| S540 | if (objectType(k) ==1) { |
| | bsRelatedTo(k,k+1)=1; |
| | bsRelatedTo(k+1,k)=1; |
| | bsRelatedTo(k+1,k+1)=1; |
| | objectIsGrouped(k)=1; |
| | objectIsGrouped(k+1)=1; |
| | k=k+1; |
| | } |
| | } |

METHOD AND AN APPARATUS FOR PROCESSING AN AUDIO SIGNAL

This application is the National Phase of PCT/KR2008/001318 filed on Mar. 7, 2008, which claims priority under 35 U.S.C. 119(e) to U.S. Provisional Application No. 60/894,162 filed on Mar. 9, 2007, U.S. Provisional Application No. 60/942,967 filed Jun. 8, 2007 and U.S. Provisional Application No. 61/012,022 filed Dec. 6, 2007 and under 35 U.S.C. 119(a) to Patent Application No. KR-10-2008-0021381 filed in Republic of Korea on Mar. 7, 2008, all of which are hereby expressly incorporated by reference into the present application.

TECHNICAL FIELD

The present invention relates to a method and an apparatus for processing an audio signal, and more particularly, to an audio signal processing method and apparatus particularly suitable for processing an audio signal received via one of a digital medium, a broadcast signal and the like.

BACKGROUND ART

Generally, in processing an object based audio signal, a single object constituting an input signal is processed as an independent object. In this case, since correlation may exist between objects, efficient coding is possible in case of performing coding using the correlation.

DISCLOSURE OF THE INVENTION

Technical Problem

Technical Solution

Accordingly, the present invention is directed to enhance processing efficiency of audio signal.

An object of the present invention is to provide a method of processing a signal using correlation information between objects in processing an object based audio signal.

Another object of the present invention is to provide a method of grouping correlated objects.

Another object of the present invention is to provide a method of obtaining information indicating correlation between grouped objects.

Another object of the present invention is to provide a method of transmitting meta information on an object.

Advantageous Effects

Accordingly, the present invention provides the following effects or advantages.

First of all, in case of object signals having close correlation in-between, it is able to enhance audio signal processing efficiency by providing a method of grouping them into a group. Secondly, it is able to further enhance efficiency by transmitting the same information on the grouped objects. Thirdly, by transmitting detailed attribute information on each object, it is able to control a user-specific object directly and in detail.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3 to 5 are diagrams of syntax for a method of obtaining information indicating correlation of grouped objects according to an embodiment of the present invention.

BEST MODE

Figure 1:
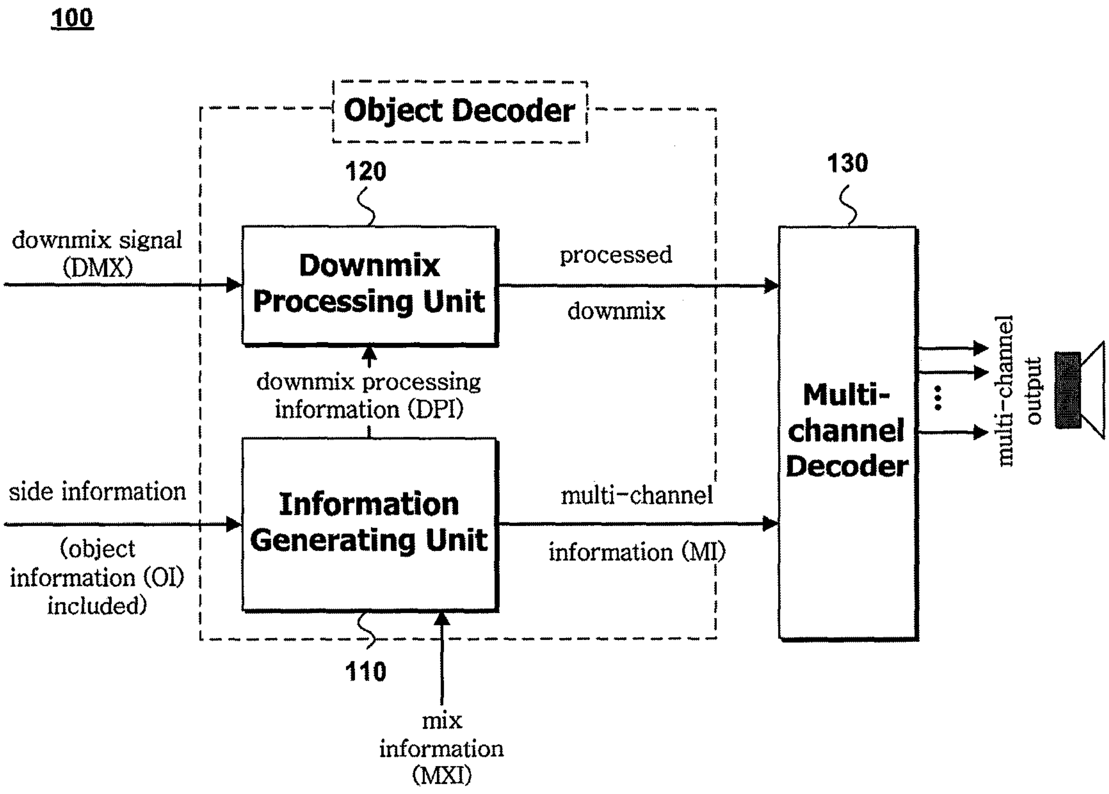
FIG. 1 is a diagram of an audio signal processing apparatus according to an embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio signal according to the present invention includes receiving the audio signal including object information, obtaining correlation information indicating whether an object is grouped with other object from the received audio signal, and obtaining one meta information common to grouped objects based on the correlation information.

Preferably, the method further includes obtaining sub-meta information on at least one object of the grouped objects, wherein the sub-meta information indicates individual attribute of each of the grouped objects.

More preferably, the method further includes generating meta information intrinsic to each object using the meta information and the sub-meta information.

And, the method further includes obtaining flag information indicating whether to obtain the sub-meta information, wherein the sub-meta information is obtained based on the flag information.

Preferably, the method further includes obtaining identification information indicating sub-meta information on at least one object of the grouped objects, wherein the sub-meta information of the grouped objects is checked based on the identification information.

Preferably, the method further includes obtaining index information indicating a type of each of the grouped objects, wherein the meta information is obtained based on the index information.

Preferably, if the grouped objects include an object indicating a left channel and an object indicating a right channel, the meta information of the object indicating the left channel is obtained only.

Preferably, the method further includes obtaining flag information indicating whether the meta information was transmitted, wherein the meta information is obtained based on the flag information.

Preferably, the meta information includes a character number of meta-data and each character information of the meta-data.

To further achieve these and other advantages and in accordance with the purpose of the present invention, a method of processing an audio signal according to the present invention includes receiving the audio signal including object information, obtaining object type information indicating whether there is a correlation between objects from the received audio signal, deriving correlation information indicating whether an object is grouped with other object based on the object type information, and obtaining one meta information common to grouped objects based on the correlation information.

To further achieve these and other advantages and in accordance with the purpose of the present invention, a method of processing an audio signal according to the present invention includes generating correlation information according to correlation between object signals, grouping correlated objects based on the correlation information, and generating one meta information common to the grouped objects.

To further achieve these and other advantages and in accordance with the purpose of the present invention, an apparatus for processing an audio signal includes a first information generating unit obtaining correlation information indicating whether an object is grouped with other object from the audio signal including object information and a second information generating unit obtaining one meta information common to grouped objects based on the correlation information.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings. This does not put limitation of the technical idea, core configuration and operation of the present invention.

Moreover, terminologies used currently and widely are selected as terminologies used in this disclosure of the present invention. In some cases, terminologies arbitrarily selected by the applicant are used for the description of the present invention. For this, the accurate or correct meanings are specified in detailed description of the corresponding part. Therefore, it is understood that the arbitrarily selected terminology is not only simply construed as the name of the terminology used in this disclosure but also construed as the meaning of the corresponding terminology.

In particular, information in this disclosure is the terminology relating to values, parameters, coefficients, elements and the like and may be construed as different meanings, which does not put limitation on the present invention.

FIG. 1 is a diagram of an audio signal processing apparatus according to an embodiment of the present invention.

Referring to FIG. 1, an audio signal processing apparatus 100 according to an embodiment of the present invention includes an information generating unit 110, a downmix processing unit 120, and a multi-channel decoder 130.

The information generating unit 110 receives side information containing object information (OI) and the lie via an audio signal bit stream and receives mix information (MXI) via user interface. In this case, the object information (OI) is the information about objects contained within a downmix signal and may include object level information, object correlation information, meta information and the like.

A method of transmitting meta information of the object information (OI) and a structure of a bit stream of an audio signal containing the meta information will be explained in detail with reference to FIGS. 2 to 6.

Meanwhile, the mix information (MXI) is the information generated based on object position information, object gain information, playback configuration information and the like. In particular, the object position information is the information inputted by a user to control a position or panning of each object. And, the object gain information is the information inputted by a user to control a gain of each object. The playback configuration information is the information containing the number of speakers, a position of a speaker, ambient information (virtual position of speaker) and the like. The playback configuration information may be inputted by a user, stored in previous or received from another device.

The downmix processing unit 120 receives downmix information (hereinafter named a downmix signal (DMX)) and then processes the downmix signal (DMX) using downmix processing information (DPI). And, it is able to process the downmix signal (DMX) to control a panning or gain of object.

The multi-channel decoder 130 receives the processed downmix and is able to generate a multi-channel signal by upmixing the processed downmix signal using multi-channel information (MI).

A method of transmitting meta information of the object information (OI) and a structure of a bit stream of an audio signal containing the meta information are explained in detail as follows.

Figure 2:
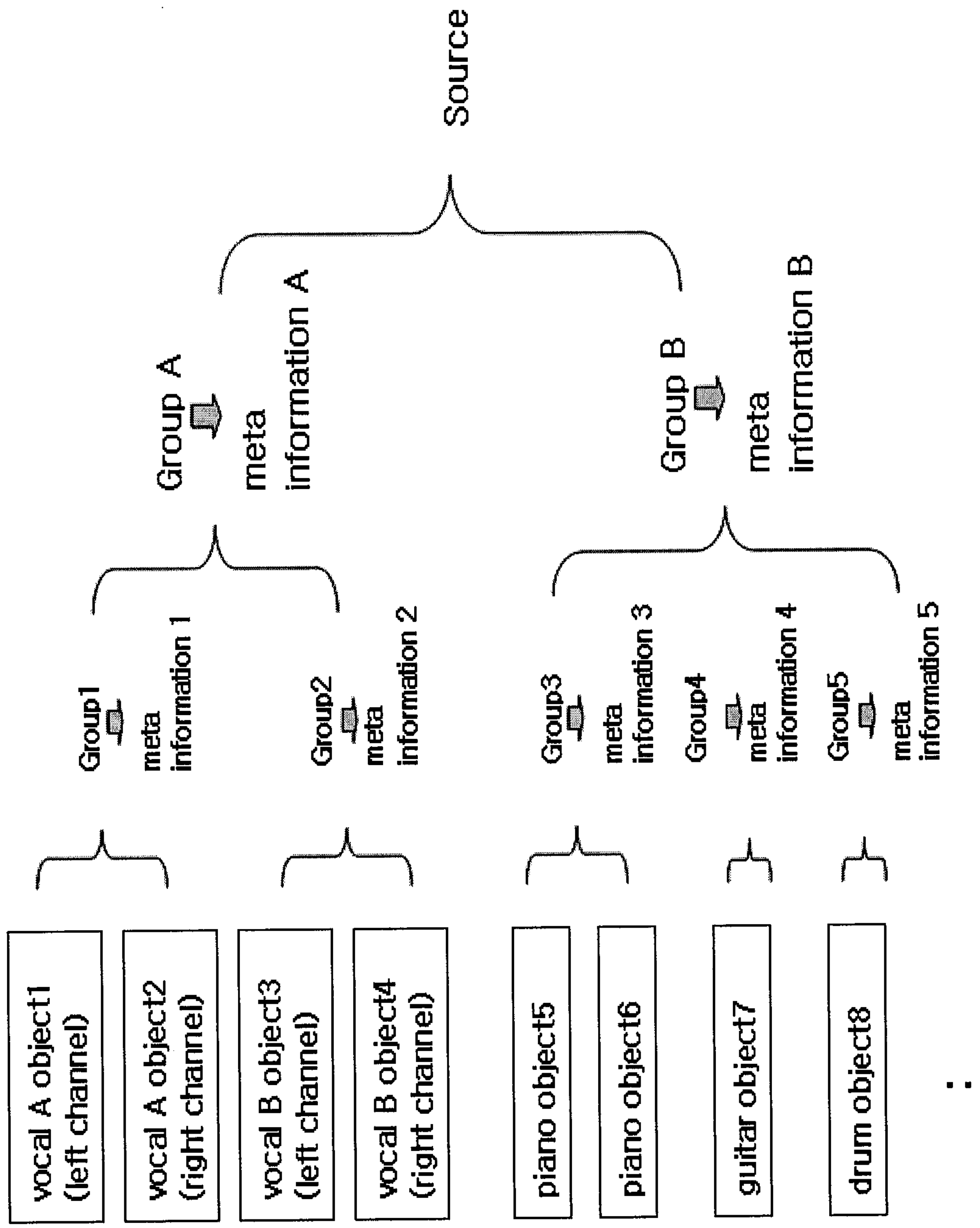
FIG. 2 is a diagram of a method of transmitting meta information on an object according to an embodiment of the present invention.

FIG. 2 is a diagram of a method of transmitting meta information on an object according to an embodiment of the present invention.

In object-based audio coding, meta information on object can be transmitted and received. For instance, in the course of downmixing a plurality of objects into mono or stereo signal, meta information can be extracted from each object signal. And, the meta information can be controlled by a selection made by a user.

In this case, the meta information may mean meta-data. The meta-data is the data about data and may mean the data that describes attribute of information resource. Namely, the meta-data is not the data (e.g., video, audio, etc.) to be actually stored but means the data that provides information directly or indirectly associated with the data. If such meta-data is used, it is able to verify whether it is the data specified by a user and search for specific data easily and quickly. In particular, management facilitation is secured in aspect of possessing data or search facilitation is secured in aspect of using data.

In object-based audio coding, the meta information may mean the information that indicates attribute of object. For instance, the meta information can indicate whether one of a plurality of object signals constituting a sound source corresponds to a vocal object, a background object or the like. And, the meta information is able to indicate whether an object in the vocal object corresponds to an object for a left channel or an object for a right channel. Moreover, the meta information is able to indicate whether an object in the background object corresponds to a piano object, a drum object, a guitar object or one of other musical instrument objects.

Yet, in case of object signals having close correlation in-between, it is able to transmit meta information common to each object signal. So, if common information is transmitted once by grouping the object signals into one group, it is able to raise efficiency higher. For instance, assume that there are two vocal objects (left channel object and right channel object) obtained from stereo signal. In this case, the left channel object and the right channel object have the same attribute called 'vocal object'. And, the case of transmitting one common meta information only may be more efficient than the case of transmitting independent meta information per object. Hence, by grouping correlated object signals, it is able to transmit meta information on the grouped objects once only.

For instance, referring to FIG. 2, assume that there are vocal object A, vocal object B, piano object 5, piano object 6, guitar object 7 and drum object 8. The vocal object A may include a left channel object (vocal A object 1) and a right channel object (vocal A object 2). Likewise, the vocal object B can include a let channel object (vocal B object 3) and a right channel object (vocal B object 4).

In this case, it is able to group the correlated object signals. For instance, it is able to regard the left channel object (vocal A object 1) of the vocal object A and the right channel object (vocal A object 2) of the vocal object A as correlated objects. Hence, it is able to group them into a group (Group 1). Likewise, it is able to regard the left channel object (vocal B object 3) of the vocal object B and the right channel object (vocal B object 4) of the vocal object B as correlated objects. Hence, it is able to group them into a group (Group 2).

Moreover, since the piano object 5 and the piano object 6 have correlation in-between, it is able to group them into a group (Group 3). Thus, it is able to transmit meta information on the grouped objects (Group 1, Group2, Group 3).

Moreover, a single object can be set to a single group as well as a plurality of objects. For instance, the guitar object (guitar object 7) can be set to a single group (Group 4), or the drum object (drum object 8) can be set to a single group (group 5).

Furthermore, the Group 1 and the Group 2 have close correlation as vocal object in-between. So, the Group 1 and the Group 2 can be grouped into another group (Group A). the piano objects (piano object 5, piano object 6), the guitar object (guitar object 7) and the drum object (drum object 8) have close correlation as background object or musical instrument object. Hence, it is able to group the Group 3, Group 4 and Group 5 into another group (group B). Thus, it is able to transmit meta information on the grouped objects (Group A, group B) once only. In this case, the Group 1 or the Group 2 can be regarded as a sort of subgroup for the Group A. And, the Group 3, the Group 4 or the Group 5 can be regarded as a sort of subgroup for the Group B.

According to another embodiment of the present invention, it is able to obtain sub-meta information on an object signal. In this case, the sub-meta information is able to indicate individual attribute of each of the grouped objects. For instance, in case of the vocal object, it is able to separately extract information indicating a left channel object and information indicating a right channel object. In particular, through the individual attribute information on the object, it is able to directly know whether currently extracted information is the information indicating the left channel object (vocal A object 1) of the vocal object A or the right channel object (vocal A object 2) of the vocal object A. And, the sub-meta information can be extracted from a header.

And, it is able to generate intrinsic meta information on each object using the meta information and the sub-meta information.

According to another embodiment, it is able to define detailed attribute information on an object signal using flag information. For instance, if flag information on a vocal object is 0, it means the left channel object of the vocal object. If flag information on a vocal object is 1, it may mean the right channel object. Alternatively, it is able to set the left channel object of the vocal object to a default value and next information can be set to the right channel object of the vocal object without separate information.

According to another embodiment of the present invention, it is able to utilize index information on an object together with meta information on the object. For instance, attribute information on an object is allocated by an index and then decided to be included in a table in advance. In this case, the object attribute information indicated by the index may mean meta information. And, the index information may be the information indicating a type of the object. It is able to assign attribute information (e.g., musical instrument name) on objects to 0~126 and '127' can be inputted as a text. For specific example, in case of a musical instrument object, information on an instrument name and an instrument player (e.g., guitar: Jimmy Page) can be transmitted as meta information. In this case, the instrument name is transmitted using index information according to a previously decided table and information on the instrument player can be transmitted as meta information.

FIGS. 3 to 5 are diagrams of syntax for a method of obtaining information indicating correlation of grouped objects according to an embodiment of the present invention.

In processing an object-based audio signal, a single object constituting an input signal is processed as an independent object. For instance, in case that there is a stereo signal constituting a vocal, it can be processed by recognizing a left channel signal as a single object and a right channel signal as a single object. In case of constituting an object signal in the above manner, correlation may exist between objects having the same origin of signal. When coding is performed using the correlation, more efficient coding is possible. For instance, there can exist correlation between an object constituted with a left channel signal of a stereo signal constituting a vocal and an object constituted with a right channel signal thereof. And, information on the correlation is transmitted to be used.

Objects having the correlation are grouped and information common to the grouped objects is then transmitted once only. Hence, more efficient coding is possible.

According to an embodiment of the present invention, after correlated objects are grouped, it is necessary to define the syntax for transmitting information on the correlation. For instance, it is able to define the syntax shown in FIG. 3.

Referring to FIG. 3, the bold style may mean the information transmitted from a bit stream [S310]. In this case, when a single object is a part of stereo or multi-channel object, 'bsRelatedTo' may be the information that indicates whether other objects are parts of the same stereo or multi-channel object. The bsRelatedTo enables 1-bit information to be obtained from a bit stream. For instance, if bsRelatedTo[i][j]=1, it may mean that an object i and an object j correspond to channels of the same stereo or multi-channel object.

It is able to check whether objects constitute a group based on a value of the bsRelatedTo [S320]. By checking the bsRelatedTo value for each object, it is able to check information on the correlation between objects [S330]. Thus, by transmitting the same information (e.g., meta information) for the grouped objects having the correlation in-between once only, more efficient coding is enabled.

The operational principle of the syntax shown in FIG. 3 is explained as follows. For instance, assume that there are seven objects, assume that objects 3 and 4 of the seven objects are correlated with each other, and assume that objects 5 and 6 of the seven objects are correlated with each other. Namely, each of the objects 1, 2 and 7 can be regarded as an object of a mono signal. And, the objects 3 and 4 or the objects 5 and 6 can be regarded as an object of a stereo signal. If so, a bit stream inputted by pseudo-code can be represented as the following 21 bits.

[0 0 0 0 0 0 0 0 0 0 1 0 0 0 0 0 0 1 0 0]

For another instance, assume that there are seven objects, that objects 1, 3 and 5 of the seven objects are correlated with each other, and that objects 2 and 6 of the seven objects are correlated with each other. Namely, each of the objects 4 and 7 can be regarded as an object of a mono signal. And, the objects 1, 3 and 5 or the objects 2 and 6 can be regarded as an object of a multi-channel signal. If so, a bit stream inputted by pseudo-code can be represented as the following 14 bits.

[0 1 0 1 0 0 0 1 0 0 0 0 0 0]

This is represented by the principle shown in Table 1.

TABLE 1

| | obj1 | obj2 | obj3 | obj4 | obj5 | obj6 | Obj7 |
|---|---|---|---|---|---|---|---|
| Obj1 | NA | 0 | 1 | 0 | 1 | 0 | 0 |
| Obj2 | NA | NA | NA | 0 | NA | 1 | 0 |
| Obj3 | NA | NA | NA | 0 | NA | NA | 0 |
| Obj4 | NA | NA | NA | NA | NA | NA | 0 |
| Obj5 | NA | NA | NA | NA | NA | NA | 0 |
| Obj6 | NA | NA | NA | NA | NA | NA | 0 |
| Obj7 | NA | NA | NA | NA | NA | NA | NA |

In Table 1, 'NA' means that information is not transmitted and '0' or '1' may mean type of the information. A value of 1 is transmitted to correlated objects. So, 'bsRelatedTo' by this can be configured as Table 2.

TABLE 2

| | obj1 | obj2 | obj3 | obj4 | obj5 | obj6 | Obj7 |
|---|---|---|---|---|---|---|---|
| Obj1 | 1 | 0 | 1 | 0 | 1 | 0 | 0 |
| Obj2 | 0 | 1 | 0 | 0 | 0 | 1 | 0 |
| Obj3 | 1 | 0 | 1 | 0 | 1 | 0 | 0 |
| Obj4 | 0 | 0 | 0 | 1 | 0 | 0 | 0 |
| Obj5 | 1 | 0 | 1 | 0 | 1 | 0 | 0 |
| Obj6 | 0 | 1 | 0 | 0 | 0 | 1 | 0 |
| Obj7 | 0 | 0 | 0 | 0 | 0 | 0 | 1 |

Referring to Table 2, since the objects 1, 3 and 5 have correlation in-between, a value of 1 is transmitted and the objects 2, 4, 6 and 7 having no correlation with the object 1 do not have correlation with the object 3 or 5. Likewise, correlation information on the object 1 is naturally identical to that of the object 3 or 5. Hence, it is not necessary to transmit the same information on the objects having the correlation with the object 1. Likewise, it is not necessary to transmit information on the object 6 having the correlation with the object 2. Based on this, a bit stream inputted by pseudo-code can be represented as the following 10 bits.

[0 1 0 1 0 0 0 1 0 0]

This bit stream can be interpreted as Table 3.

TABLE 3

| | obj1 | obj2 | obj3 | obj4 | obj5 | obj6 | Obj7 |
|---|---|---|---|---|---|---|---|
| Obj1 | NA | 0 | 1 | 0 | 1 | 0 | 0 |
| Obj2 | NA | NA | NA | 0 | NA | 1 | 0 |
| Obj3 | NA | NA | NA | NA | NA | NA | NA |
| Obj4 | NA | NA | NA | NA | NA | NA | 0 |
| Obj5 | NA | NA | NA | NA | NA | NA | NA |
| Obj6 | NA | NA | NA | NA | NA | NA | NA |
| Obj7 | NA | NA | NA | NA | NA | NA | NA |

Hence, it is able to configure 'bsRelatedTo' by the same scheme using the bit stream transmitted via Table 3.

According to another embodiment of the present invention, it is able to define the syntax for indicating a correlation between objects for a random object [S410]. For instance, referring to FIG. 4, it is able to define 1-bit bsObjectType to indicate the correlation between objects. If bsObjectType=0, it may mean an object of a mono signal. If bsObjectType=1, it may mean an object of a stereo signal. Thus, if bsObjectType=1, it is able to check information on correlation between objects based on a value of the bsObjectType. And, it is also able to check whether the respective objects constitute a group [S420].

Likewise, a bold style shown in FIG. 4 may mean the information transmitted from a bit stream. The operational principle of the syntax shown in FIG. 4 is explained as follows. For instance, assume that there are seven objects, in which objects 3 and 4 are correlated with each other and in which objects 5 and 6 are correlated with each other. Namely, since objects 1, 2 and 7 can be regarded as an object of a mono signal, a value of the bsObjectType is 0. Since objects 3 and 4 or objects 5 and 6 can be regarded as an object of a stereo signal, it results in bsObjectType=1. Hence, an input stream inputted by pseudo-code can be represented as the following seven bits.

[0 0 1 1 1 1 0]

In the above embodiment, the following assumption may be necessary. For instance, correlated objects can be transmitted by being adjacent to each other. And, the correlation between objects can exist between objects taking each channel signal of a stereo signal only.

According to another embodiment of the present invention, in case of stereo signal, a predetermined bit number is allocated to a first channel and a bit number may not be allocated to the rest channel. For instance, in the above example, it is able to reduce a size of bit stream by allocating 0 bit in case of a mono signal, 1 bit to a first channel in case of a stereo signal and 0 bit to the rest channel of the stereo signal. So, a bit stream inputted by pseudo-code can be represented as the following 5 bits.

[0 0 1 1 0]

The above embodiment is able to define the syntax shown in FIG. 5.

In the embodiment of FIG. 5, if '1' is firstly extracted from a bit stream [S510], the corresponding object may mean a left channel signal of stereo signal. If '1' is extracted subsequently, it may mean a right channel signal of the stereo signal. In the embodiment of FIG. 5, if '1' is firstly extracted from a bit stream [S510], the corresponding object may mean a left channel signal of a stereo signal. And, the next may mean a right channel signal of the stereo signal without extracting another flag information.

As mentioned in the foregoing description of FIG. 4, it is able to define 1-bit bsObjectType to indicate a correlation between objects [S520]. If bsObjectType=0, it means that a current object is the object of a mono signal. If bsObjectType=1, it may mean that a current object is the object of a stereo signal. If the bsObjectType is 1, it is able to check a type (objectType) of each object [S530]. Thus, if objectType=1, it is able to check information on correlation between objects based on a value of the bsRelatedTo. And, it is also able to check whether the respective objects constitute a group [S540].

According to another embodiment of the present invention, a method of utilizing information of an original channel for an object obtained from a stereo signal is proposed.

In object-based audio coding, information on an object is transmitted and then utilized for decoding. The object information can include object level information, object correlation information, object gain information and the like. In this case, the object gain information is the information inputted by a user to control a gain of each object. In particular, the object gain information indicates how a specific object is contained in a downmix signal and can be represented as Formula 1.

$$x\_1=\text{sum}(a\_i*s\_i)$$

$$x\_2=\text{sum}(b\_i*s\_i) \quad \text{[Formula 1]}$$

In Formula 1, x_1 and x_2 are downmix signals. For instance, x_1 means a left channel signal of a downmix signal and x_2 may mean a right channel signal of the downmix signal. s_i means an $i^{th}$ object signal, a_i means object gain information indicating a gain included in a left channel of the $i^{th}$ object signal, and b_i may mean object gain information indicating a gain included in a right channel of the $i^{th}$ object signal.

The object gain information can be contained in a bit stream in various ways. For instance, there is a method that a_i and b_i can be directly included in the bit stream. Alternatively, there is a method that a ratio of a_i to b_i and either a_i or b_i can be included. Alternatively, there is a method that a ratio of a_i to b_i and an energy sum of a_i and b_i can be included.

If s_i is an object signal constituted with a signal of a specific channel in a stereo signal, it is able to assume that the object signal is included in the channel only in rendering a downmix signal. Namely, if the s_i is the object constituted with the left channel signal of the stereo signal, it is able to assume that the b_i is always 0. Likewise, if s_j is the object constituted with the right channel signal of the stereo signal, it can be observed that a_j is always 0.

In the present invention, in case that an object signal is an object of a stereo signal, it is able to reduce a transmit amount of object gain information according to a channel to which the object signal corresponds. Using the embodiments shown in Table 2 and Table 3, it is able to know a channel corresponding to the object signal if the object signal is an object of a stereo signal. If so, it is able to further reduce a bit rate.

A decoder determines whether there is channel information in each object signal using the transmitted bsObjectType value. If the object signal is an object of a stereo signal, the decoder is able to receive only one value of object gain information. In case of the object signal is an object of the stereo signal, if the object signal is continuously processed by encoder, it is able to configure and transmit the object gain information as follows. For instance, it is able to transmit a_i and b_i+1. In this case, it is able to obtain a_i and b_i+1 from the transmitted object gain information. And, it is able to reduce a bit rate by b_l=a_i+1=0.

In object-based audio coding, it is able to configure an object signal using a multi-channel signal. For instance, a multi-channel signal is rendered into a stereo downmix signal using MPEG Surround encoder. It is then able to generate the object signal using the stereo downmix signal. The aforesaid embodiments are applicable in the same manner. And, the same principle is applicable to a case of using a multi-channel downmix signal in object-based audio coding as well.

Structure of the object-based bit stream is explained in detail as follows.

Figure 6:
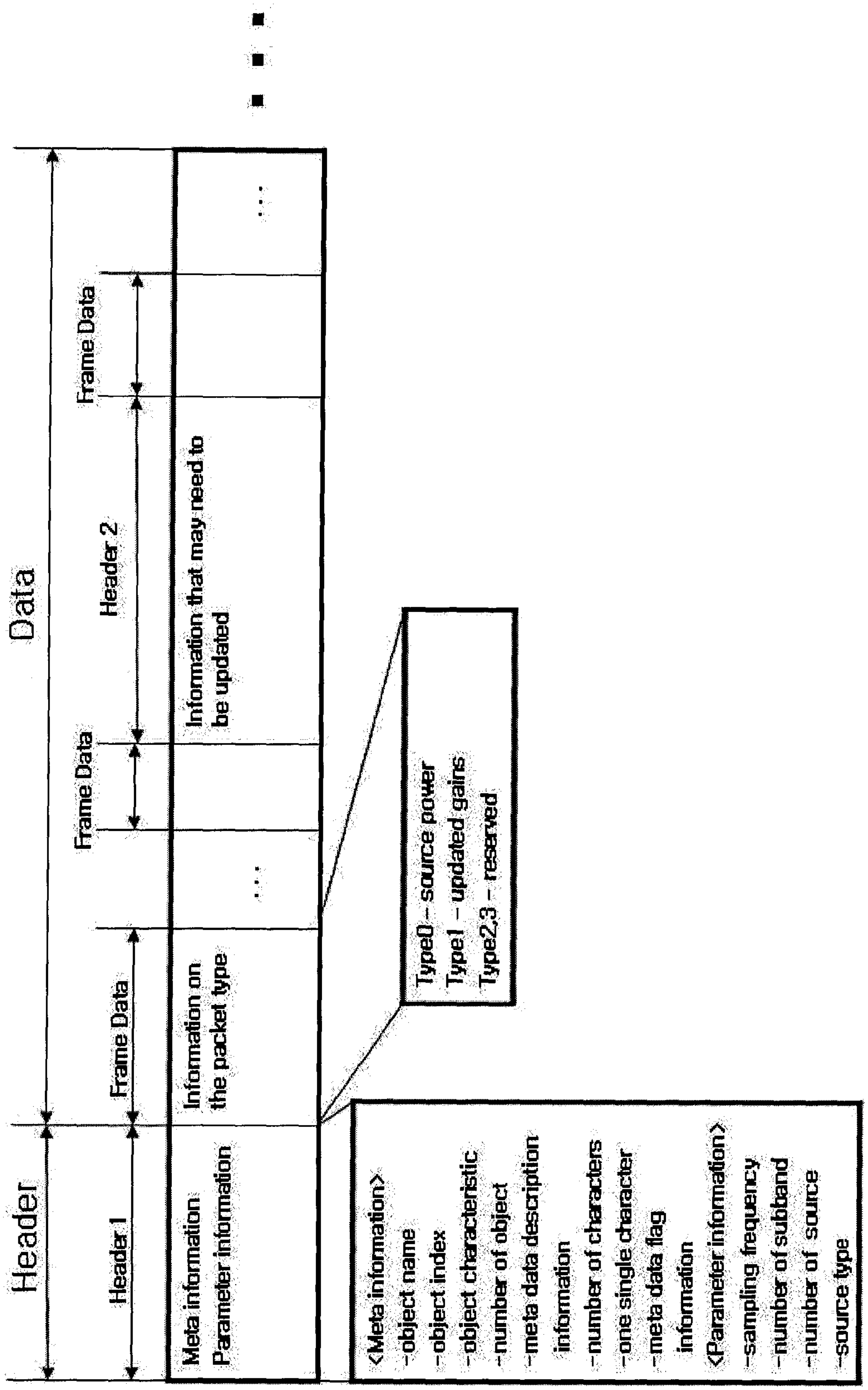
FIG. 6 is a structural diagram of a bit stream containing meta information on object according to an embodiment of the present invention.

FIG. 6 is a structural diagram of a bit stream containing meta information on object according to an embodiment of the present invention.

Bit stream may mean a bundle of parameters or data or a general bit stream in a compressed type for transmission or storage. Moreover, bit stream can be interpreted in a wider meaning to indicate a type of parameter before the representation as bit stream. A decoding device is able to obtain object information from the object-based bit stream. Information contained in the object-based bit stream is explained in the following description.

Referring to FIG. 6, an object-based bit stream can include a header and data. The header (Header 1) can include meta information, parameter information and the like. And, the meta information can contain the following information. For instance, the meta information can contain object name (object name), an index indicating an object (object index), detailed attribute information on an object (object characteristic), information on the number of objects (number of object), description information on meta information (meta-data description information), information on the number of characters of meta-data (number of characters), character information of meta-data (one single character), meta-data flag information (meta-data flag information) and the like.

In this case, the object name (object name) may mean information indicating attribute of such an object as a vocal object, a musical instrument object, a guitar object, a piano object and the like. The index indicating an object (object index) may mean information for assigning an index to attribute information. For instance, by assigning an index to each musical instrument name, it is able to determine a table in advance. The detailed attribute information on an object (object characteristic) may mean individual attribute information of a lower object. In this case, when similar objects are grouped into a single group object, the lower object may mean each of the similar objects. For instance, in case of a vocal object, there are information indicating a left channel object and information indicating a right channel object.

The information on the number of objects (number of object) may mean the number of objects when object-based audio signal parameters are transmitted. The description information on meta information (meta-data description information) may mean description information on meta data for an encoded object. The information on the number of characters of meta-data (number of characters) may mean the number of characters used for meta-data description of a single object. The character information of meta-data (one single character) may mean each character of meta-data of a single object. And, the meta-data flag information (meta-data flag information) may mean a flag indicating whether meta-data information of encoded objects will be transmitted.

Meanwhile, the parameter information can include a sampling frequency, the number of subbands, the number of source signals, a source type and the like. Optionally, the parameter information can include playback configuration information of a source signal and the like.

The data can include at least one frame data (Frame Data). If necessary, a header (Header 2) can be included together with the frame data. In this case, the Header 2 can contain informations that may need to be updated.

The frame data can include information on a data type included in each frame. For instance, in case of a first data type (Type0), the frame data can include minimum information. For detailed example, the first data type (Type0) can include a source power associated with side information. In case of a second data type (Type1), the frame data can include gains that are additionally updated. In case of third and fourth data types, the frame data can be allocated as a reserved area for a future use. If the bit stream is used for a broadcast, the reserved area can include information (e.g., sampling frequency, number of subbands, etc.) necessary to match a tuning of a broadcast signal.

As mentioned in the foregoing description, the signal processing apparatus according to the present invention, which is provided to such a transmitting/receiving device for such multimedia broadcasting as DMB (digital multimedia broadcasting), is usable to decode audio signals, data signals and the like. And, the multimedia broadcast transmitting/receiving device can include a mobile communication terminal.

Besides, the above-described signal processing method according to the present invention can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the bit stream generated by the signal processing method is stored in a computer-readable recording medium or can be transmitted via wire/wireless communication network.

INDUSTRIAL APPLICABILITY

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of processing an audio signal with an object decoder, the method comprising:

receiving a downmix signal including at least one object, and a bitstream including object information and meta information;

obtaining correlation information indicating whether an object is grouped with other objects from the object information of the bitstream;

receiving mix information;

obtaining the meta information associated with the at least one object based on the correlation information, the meta information being a description for indicating attribute information of the at least one object; and generating at least one of downmix processing information and multi-channel information based on the object information and the mix information, wherein the object information includes at least one of object level information, object correlation information, and object gain information, and wherein the meta information includes object name information, an index indicating an object, detailed attribute information for an object characteristic, information on the number of objects, description information on the meta information for the objects, information on the number of characters of the meta information indicating the number of characters used for description information on the meta information of a single object, and character information indicating each character of meta information of a single object.

2. The method of claim 1, further comprising obtaining sub-meta information on at least one object of grouped objects, wherein the sub-meta information indicates individual attributes of each of the grouped objects.

3. The method of claim 2, further comprising obtaining flag information indicating whether to obtain the sub-meta information.

4. The method of claim 1, further comprising:

processing the downmix signal using the downmix processing information; and generating a multi-channel signal based on the processed downmix signal and the multi-channel information.

5. The method of claim 1, further comprising obtaining identification information indicating sub-meta information on at least one object of grouped objects, wherein the sub-meta information of the grouped objects is checked based on the identification information.

6. The method of claim 1, further comprising obtaining index information indicating a type of each object of grouped objects, wherein the meta information is obtained based on the index information.

7. The method of claim 1, wherein when grouped objects include at least one object indicating a left channel and at least one object indicating a right channel, only the meta information of the at least one object indicating the left channel is obtained.

8. The method of claim 1, further comprising obtaining flag information indicating whether the meta information was transmitted, wherein the meta information is obtained based on the flag information.

9. The method of claim 1, wherein the object information further includes object type information indicating correlation between objects for a random object.

10. The method of claim 9, wherein the object type information defines whether the object is an object of a mono signal or a stereo signal.

11. The method of claim 10, wherein the method further includes;

checking correlation information based on the object type information.

12. A non-transitory computer-readable medium comprising a computer program recorded thereon, which when executed, performs the method of claim 1.

13. A method of processing an audio signal to be received by an object decoder, the method comprising:

generating a downmix signal by downmixing the audio signal, wherein the audio signal includes a plurality of objects;

generating correlation information according to at least one grouping amongst objects of the plurality of objects;

generating meta information associated with the plurality of objects, the meta information being a description for indicating attribute information of the plural objects;

transmitting the downmix signal and a bitstream including object information and the meta information, wherein the object information includes at least object correlation information and the meta information, and wherein the meta information includes object name information, an index indicating an object, detailed attribute information for an object characteristic, information on the number of objects, description information on the meta information for the objects, information on the number of characters of the meta information indicating the number of characters used for description information on the meta information of a single object, and character information indicating each character of meta information of a single object.

14. An apparatus having an object decoder for processing an audio signal, the apparatus comprising:

a receiving unit receiving a downmix signal including at least one object, and a bitstream including object information and meta information;

a first object decoder obtaining correlation information indicating whether an object is grouped with other objects from the object information of the bitstream, and obtaining meta information associated with the at least one object based on the correlation information, the meta information being a description for indicating attribute information of the at least one of object; and a second object decoder receiving mix information and generating at least one of downmix processing information and multi-channel information based on the object information and the mix information, wherein the object information includes at least one of object level information, object correlation information, and object gain information, and wherein the meta information includes object name information, an index indicating an object, detailed attribute information for an object characteristic, information on the number of objects, description information on the meta information for the objects, information on the number of characters of the meta information indicating the number of characters used for description information on the meta information of a single object, and character information indicating each character of meta information of a single object.

* * * * *